(12) United States Patent
Carre et al.

(10) Patent No.: US 7,585,569 B2
(45) Date of Patent: Sep. 8, 2009

(54) CERAMIC COMPOSITION WITH SILSESQUIOXANE POLYMER

(75) Inventors: Alain Robert Emile Carre, Le Chatelet-en-Brie (FR); Valerie Claudine Lacarriere, Larchant (FR); Serge Guy Marsaud, Veneux les Sablons (FR)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 11/079,835

(22) Filed: Mar. 11, 2005

(65) Prior Publication Data

US 2006/0083935 A1 Apr. 20, 2006

(30) Foreign Application Priority Data

Mar. 11, 2004 (EP) .................. 04290661

(51) Int. Cl.
B32B 27/06 (2006.01)
C08L 83/04 (2006.01)
B32B 9/04 (2006.01)

(52) U.S. Cl. .................. 428/447; 524/588; 524/858

(58) Field of Classification Search .................. 524/858; 428/447
See application file for complete search history.

(56) References Cited

U.S. PATENT DOCUMENTS

| | | | | |
|---|---|---|---|---|
| 4,255,316 A * | 3/1981 | Blizzard | .................. | 524/433 |
| 4,458,039 A * | 7/1984 | Eickman | .................. | 523/216 |
| 4,632,798 A * | 12/1986 | Eickman et al. | .................. | 264/272.17 |
| 4,719,250 A * | 1/1988 | Eickman et al. | .................. | 523/212 |
| 4,720,424 A * | 1/1988 | Eickman et al. | .................. | 428/323 |
| 4,802,061 A * | 1/1989 | Portugall et al. | .................. | 361/760 |
| 4,855,115 A * | 8/1989 | Imanari et al. | .................. | 423/239.1 |
| 4,981,530 A | 1/1991 | Clodgo et al. | | |
| 4,983,423 A * | 1/1991 | Goldsmith | .................. | 427/230 |
| 5,055,429 A * | 10/1991 | James et al. | .................. | 501/80 |
| 5,106,502 A * | 4/1992 | Goldsmith | .................. | 210/490 |
| 5,114,643 A * | 5/1992 | Beall et al. | .................. | 264/631 |
| 5,120,576 A * | 6/1992 | Goldsmith et al. | .................. | 427/245 |
| 5,128,204 A * | 7/1992 | Charmot | .................. | 428/329 |
| 5,149,748 A | 9/1992 | Shimizu et al. | .................. | 525/477 |
| 5,183,710 A * | 2/1993 | Gerbino | .................. | 428/405 |
| 5,204,432 A | 4/1993 | Saito et al. | .................. | 528/10 |
| 5,252,655 A * | 10/1993 | Parker et al. | .................. | 524/430 |
| 5,290,354 A | 3/1994 | Haluska | | |
| 5,348,760 A | 9/1994 | Parker et al. | .................. | 427/9 |
| 5,508,238 A * | 4/1996 | Zank | .................. | 501/87 |
| 5,512,351 A * | 4/1996 | Miyamichi et al. | .................. | 428/195.1 |
| 5,543,173 A * | 8/1996 | Horn et al. | .................. | 427/212 |
| 5,629,067 A | 5/1997 | Kotani et al. | | |
| 5,635,250 A * | 6/1997 | Blum et al. | .................. | 427/387 |
| 5,738,817 A * | 4/1998 | Danforth et al. | .................. | 264/603 |
| 5,939,030 A * | 8/1999 | Moxley et al. | .................. | 422/186.07 |
| 5,953,627 A * | 9/1999 | Carter et al. | .................. | 438/623 |
| 6,159,322 A * | 12/2000 | Ogata et al. | .................. | 156/230 |
| 6,171,360 B1 | 1/2001 | Suzuki et al. | .................. | 75/255 |
| 6,177,360 B1 * | 1/2001 | Carter et al. | .................. | 438/781 |
| 6,489,017 B1 | 12/2002 | Aldinger et al. | .................. | 428/323 |
| 6,699,429 B2 * | 3/2004 | Lu et al. | .................. | 264/630 |
| 6,706,405 B2 * | 3/2004 | Sanders et al. | .................. | 428/413 |
| 6,927,301 B2 * | 8/2005 | Laine et al. | .................. | 556/450 |
| 6,929,982 B2 * | 8/2005 | Gates et al. | .................. | 438/118 |
| 7,265,194 B1 * | 9/2007 | Lichtenhan et al. | .................. | 528/28 |
| 2003/0134741 A1 * | 7/2003 | Weisbeck et al. | .................. | 502/243 |
| 2004/0012111 A1 | 1/2004 | Barthelemy et al. | | |
| 2004/0028809 A1 * | 2/2004 | Bein et al. | .................. | 427/240 |
| 2004/0054047 A1 * | 3/2004 | Lai et al. | .................. | 524/268 |
| 2004/0072508 A1 * | 4/2004 | Lee et al. | .................. | 451/41 |
| 2004/0122153 A1 * | 6/2004 | Guo et al. | .................. | 524/430 |
| 2005/0159308 A1 * | 7/2005 | Bliss et al. | .................. | 502/439 |
| 2006/0263531 A1 * | 11/2006 | Lichtenhan et al. | .................. | 427/377 |

FOREIGN PATENT DOCUMENTS

| | | |
|---|---|---|
| JP | 60210569 | 10/1985 |
| JP | 62003065 | 1/1987 |

* cited by examiner

*Primary Examiner*—Randy Gulakowski
*Assistant Examiner*—Robert Loewe
(74) *Attorney, Agent, or Firm*—Joseph M. Homa

(57) ABSTRACT

A ceramic composition including a silsesquioxane polymer as a sintering agent in an amount of no more than 30% by weight. The composition is particularly useful as a ceramic cement for forming an external skin on a cordierite honeycomb substrate when the composition is composed of ground cordierite and polyaminopropylsilsesquioxane. A method of preparing the composition is also provided.

17 Claims, No Drawings

CERAMIC COMPOSITION WITH SILSESQUIOXANE POLYMER

BACKGROUND OF THE INVENTION

The present invention relates to ceramic compositions using silsesquioxanes as a sintering agent, and being suitable as ceramic substrates and cements.

Synthesis of ceramics require high temperatures and long reaction times. For example, in the formation of cordierite bodies, plasticized mixtures of raw materials and organic additives are fired at temperatures of up to 1450° C.-1550° C. for 20 to 200 hours.

Lowered processing temperatures and times are desirable to avoid expenditure of extra energy and added cost. This is particularly true in the formation of monolith honeycomb structures, such as cordierite honeycombs used in treatment applications for automotive and diesel exhaust.

Cordierite coldset cement (a mixture of ground cordierite, binder, silica, and cement) is currently used to form the exterior skin of cordierite substrates. Advantageous from a low processing temperature aspect, it is incompatible with some coating processes and chemistries. For example, excessive cordierite skin or coating cracking or spalling during subsequent calcinations steps has been observed.

It would be considered an advancement in the art to provide ceramic compositions from commonly available inorganic raw-materials that can be processed at low temperatures and have high strength, which can also be used in the manufacturing of monolithic substrates or as a cement mixtures for substrate skin formation.

SUMMARY OF THE INVENTION

There is provided a composition for the manufacture of a ceramic comprising a powdered ceramic material selected from the group consisting of oxides, oxidized non-oxides, and combinations thereof; and, a silsesquioxane polymer as a sintering agent for reducing the calcining temperature of the resulting ceramic and increasing the strength thereof.

The silsesquioxane has a chemical formula —(RSiO$_{1.5}$)$_n$— wherein R is selected from the group consisting of an aminopropyl group, and a tetramethyl ammonium group, wherein when R is a tetramethyl ammonium group then n is 8. Being the minor component the silsesquioxane polymer is added at no more than 30% by weight.

In one embodiment the composition is comprised of ground cordierite and polyaminopropylsilsesquioxane to form a cement which is applied to the exterior of a cordierite honeycomb substrate to form an external coating.

There is also provided a method for forming inventive composition into a ceramic structure, by forming a mixture, shaping, and then drying and calcining at a temperature and for a time sufficient to form a strong ceramic having a low CTE.

DETAILED DESCRIPTION OF THE INVENTION

In the present invention it has been found that silsesquioxane polymers can be used as sintering agents in powdered inorganic compositions to enable lower processing temperatures and higher MOR strengths in the resulting ceramic structure.

The powdered ceramic material is selected from the group consisting of oxides, oxidized non-oxides and combinations thereof. Regardless of the type of ceramic material, the median particle size is between 0.1-100 micrometers, and preferably 1-50 micrometers.

By oxides is meant minerals or materials containing oxygen or hydroxide. Preferred oxides for purposes of the present invention are silica-based and alumina-based oxides. Silica-based oxides include cordierite (2MgO.2Al$_2$O$_3$.5SiO$_2$), zircon (ZrO$_2$.SiO$_2$), sillimanite (Al$_2$O$_3$.SiO$_2$), mullite (3Al$_2$O$_3$.2SiO$_2$) and the like. Cordierite (2MgO.2Al$_2$O$_3$.5SiO$_2$) is an especially preferred silicate. Alumina-based oxides include (Al$_2$O$_3$), aluminum titanate (Al$_2$O$_3$.TiO$_2$), combinations thereof, and the like.

By oxidized non-oxide material is meant non-oxide materials that do not contain oxygen or hydroxide, such as those belonging to the carbides, nitrides or borides groups, that have been exposed to air (oxygen) at a temperature and for a sufficient time to form an oxide layer at their surface therefore becoming oxidized thereat. Particularly suitable non-oxides are silicon carbide and silicon nitride having an oxide layer at their surface.

Suitable silsesquioxanes are represented by the chemical formula —(RSiO$_{1.5}$)$_n$—, where R is selected from the group consisting of an aminopropyl group, and a tetramethyl ammonium group, such that when R is a tetramethyl ammonium group then n is 8. The nature of the R group determines the properties of the resulting silsesquioxane. Specifically, the R groups chosen herein provide silsesquioxanes which have a positive charge and are water soluble.

Where R is an aminopropyl group, the silsesquioxane polymer is polyaminopropylsilsesquioxane. Polyaminopropylsilsesquioxanes are known in the art. The process of obtaining polyaminopropylsilsesquioxane comprises hydrolysis and polymerization of aminosilanes, as described in U.S. Pat. No. 4,981,530 herein incorporated by reference in its entirety. In one instance 3-aminopropyltriethoxysilane (GAPS) is polymerized in the presence of water according to the following reaction: n H$_2$N—(CH$_2$)$_3$—Si(OC$_2$H$_5$)$_3$+1.5n H$_2$O→(H$_2$N—(CH$_2$)$_3$—SiO$_{1.5}$)$_n$+3n C$_2$H$_5$OH. It may be advantageous to modify the pH of the water as a function of the mineral powder used for polymerized GAPS. In one embodiment the water pH is ≧10. In another embodiment the water pH is less than 5. For example, alumina-based ceramics prepared as described herein have a higher MOR strength (MPa) when the water has a pH of less than 5.

Where R is a tetramethyl group, the silsesquioxane polymer is polytetramethylsilsesquioxane. Polytetramethylsilsesquioxanes are known in the art. For purposes of the present invention when R is a tetramethyl group, n must be 8. For example octatetramethyl ammonium-polyhedral oligomeric silsesquioxane (Octa-TMA-POSS) which satisfies the R and n requirements and is commercially available from Hybrid Plastics (Fountain Valley, Calif.) is suitable here.

The silsesquioxane polymer is added at no more than 30% by weight. Preferably, the mixture is composed of 70% to 99% by weight ceramic material and 1% to 30% by weight silsesquioxane polymer. More preferably, the mixture is composed of 80% to 98% by weight ceramic material and 2% to 20% by weight silsesquioxane polymer. Most preferably the mixture is composed of 86% to 93% by weight ceramic material and 7% to 14% by weight silsesquioxane polymer.

In a method for fabricating a ceramic structure according to the present invention, a mixture is formed from the silsesquioxane polymer, the ceramic powder material, and an adequate amount of solvent (i.e., water) to form a homogenous and formable paste. Optional, processing aids as known in the art such as binders, plasticizers, surfactants, fillers, lubricants, dispersants and the like may be added. Methylcellulose binder (such as Methocel A4M from Dow Corning) is useful as a binder to provide a more plasticized mixture. It has been observed that polysiloxane polymer, such as polydimethylsiloxane (silicone oil), may reduce the formation of cracks in the inventive ceramic structure.

The paste mixture is shaped or formed by any conventional method, such molding, extrusion, and the like. Then, the resulting structure is dried and calcined at a temperature and for a time sufficient to form a ceramic having an MOR of at least 5 MPa and greater, preferably at least 10 MPa, and more preferably at least 15 MPa. The ceramic has a CTE of between $4\text{-}80\times10^{-7}/°$ C., preferably between $4\text{-}25\times10^{-7}/°$ C., and more preferably $4\text{-}10\times10^{-7}/°$ C.

The drying and calcining time and temperature can be determined by a skilled artisan. Preferably drying is at 60° C. to 200° C., for 8-10 hours. Preferably calcining takes place at a temperature ranging from 500° C. to 1500° C. for at least a time of 1-10 hours. In a more preferred embodiment the calcining step is undertaken at a temperature of 500° C. to 1000° C. for at least a time of 1-10 hours. In another more preferred embodiment the calcining step is at a temperature of 500° C. for at least a time of 4 hours.

In a preferred embodiment the invention is especially suitable as a cement for the formation of an external skin on a cordierite honeycomb substrate, such as those used in treatment of automotive and diesel exhaust. In this application, the composition is comprised of 86% to 93% cordierite powder, 7% to 14% silsesquioxane polymer, and an effective amount of processing aids to form a homogenous and formable mixture. The amount of processing aids is calculated as a super addition based on the total weight of the ceramic material and polymer.

Honeycomb substrates are known in the art. Specifically, the honeycomb structure has an inlet end, an outlet end, and a multiplicity of mutually adjoining cells extending along the length of the body from the inlet end to the outlet end. The cells are separated from one another by porous walls.

Typically, honeycomb cell densities range from 10 cells/in$^2$ (1.5 cells/cm$^2$) to 1200 cells/in$^2$ (188 cells/cm$^2$). Wall thickness typically range from 0.025 to 1.5 mm (1 to 60 ml), and preferably from 0.1 to 0.75 mm (4 to 30 ml). Wall pore size typically ranges between about 0.1 to 100 micrometers, preferably between about 1 to 40 micrometers, while Wall porosity typically ranges between about 15-70%, preferably between about 25 to 50%. Suitable honeycomb substrates are composed substantially of a cordierite phase; however, other materials such as silicon carbide, aluminum nitride, calcium aluminate, may also be suitable.

The cordierite cement mixture is applied to the external surface of the honeycomb, and then the coated structure is dried and calcined to form a strong coating that adheres to the substrate. Typically, drying is at 200° C. for 8-10 hours and then the coated honeycomb body is fired to 500° C. for at least a time of 4-6 hours. Experiments have shown that the resulting external skin exhibits reduced occurrence of skin cracking or spalling, as well improved compatibility with subsequent catalyst coating processes. The external skin has a high MOR of greater than 5 MPa, and a CTE of between $4\text{-}15\times10^{-7}/°$ C.

The invention is further described with reference to the following examples, which are intended to be illustrative rather than limiting.

COMPARATIVE EXAMPLE 1

Standard Cordierite Cement

A standard cordierite cement is prepared from ground cordierite. The composition is reported in Table I.

TABLE I

| Raw Materials | Weight % |
|---|---|
| Ground Coarse Cordierite ($d_{50}$ = 40 um) | 50.0 |
| Ground Fine Cordierite ($d_{50}$ = 12 um) | 50.0 |
| Colloidal Silica (Ludox HS40) | 6.40 |
| Unifrax QF-180 aluminosilicate fiber | 26.78 |
| Methocel A4M | 0.74 |
| Deionized Water | 26.2 |

The colloidal silica, aluminosilicate fiber, methocel and water are calculated as supper additions based on 100 wt. % cordierite powder. The dry powder ingredients are first blended to form a dry powder mixture, to which the liquid component is then added. The mixture is mixed thoroughly to form a paste and then it is applied directly to the exterior of a cordierite substrate.

Modulus of rupture (MPa) and coefficient of thermal expansion measurements ($10^{-7}/°$ C.) are measured on disks measuring 32 mm in diameter and 3 mm in thickness. After drying overnight at 60° C., the resulting MOR is 4.5 MPa. After firing for 4 hours at 500° C., the resulting MOR is 1 MPa. The CTE (25-700° C.) measures at $16\times10^{-7}/°$ C.

EXAMPLE 1

A cordierite cement is prepared by mixing 64 wt. % cordierite mix powder with 16 wt. % octa-tetramethyl ammonium-polyhedral oligomeric silsesquioxane (Octa-TMA-POSS) available from Hybrid Plastics (Fountain Valley, Calif.), and 20 wt. % deionized water to form a paste, which is then applied directly to the exterior of a cordierite substrate.

MOR and CTE measurements are conducted under conditions similar to Comparative Example 1. After drying overnight at 60° C., the resulting MOR is 3 MPa. After firing for 4 hours at 500° C., the resulting MOR is 9.4 MPa. The CTE (25-700° C.) measures $10.9\times10^{-7}/°$ C. After firing the MOR of the inventive cement is higher than comparative example 1. Also, upon inspection the skin on the cordierite substrates shows no visible cracking, providing a smooth and even surface after drying.

EXAMPLE 2

A cordierite cement is prepared by mixing 6.80 grams of cordierite mix powder with 2.48 grams of GAPS polymer solution. The GAPS polymer solution is prepared from the hydrolysis and polycondensation of 3-aminopropyltriethoxysilane (GAPS) molecules. The polymerization process consists of mixing GAPS with the aliquot amount of deionized water (1.5 mole of $H_2O$ at pH of 10 for 1 mole of GAPS polymer) to form a GAPS polymer solution of $(H_2N\text{---}(CH_2)_3\text{---}SiO_{1.5})_n + 3n\ C_2H_5OH$. The resulting ceramic is composed of 86.1 wt. % cordierite and 13.9 wt. % silsesquioxane polymer.

Part of the paste mixture was dried and calcined in a silicone mold having a 32 mm diameter and 3 mm thickness. The remaining mixture was applied to the external surface of a honeycomb substrate to form a skin. After drying overnight at 60° C., appeared hard and crack free. Bubbles were observed due to the presence of ethanol ($C_2H_5OH$) in the polymer solution. After calcination for 4 hours at 500° C. the sample remained hard and crack free. On the honeycomb substrate, after drying overnight at 60° C. the skin was crack free, with a smooth appearance. However, after calcination for 4 hours at 500° C. the substrates broke apart due to the high strength and shrinkage of the cement as a result of the strong adhesion at the interface between the skin and honeycomb.

EXAMPLE 3

The high shrinkage observed in Example 2 may be explained by the condensation reactions in the silsesquioxane polymer formed. Specifically, the structure of the silsesquioxane polymer may be a function of the pH of the water used in the polymerization reaction.

Three GAPS polymer solutions having a pH of 3, 6 and 10 are prepared, and agitated for at least 24 hours. Cement mixtures are then formed from 5 grams of polymerized GAPS solution (or 12.3 wt. % dry silsesquioxane polymer) and 15.74 grams cordierite mix powder (or 87.7 wt. % cordierite).

MOR measurements are made on disks measuring 32 mm in diameter and 3 mm in thickness. For a pH of 3, after overnight drying at 60° C., the MOR measures 8 MPa, while after firing at 500° C. for 4 hours, the MOR measures 10 MPa. For a pH of 6, the MOR measures 9 and 10 respectively. For a pH of 10 the MOR measures 8 and 10 respectively. Therefore, varying the pH of water during the polymerization reaction does not have a significant impact on the mechanical properties of a cordierite cement. However, it has been observed that under alkaline conditions there is less shrinkage in ceramic skin material.

CTE measurements are made on 0.5×25 mm bars between 25-800° C. For a pH of 3, the CTE at 800° C. is $13.4 \times 10^{-7}/°$ C., while for a pH of 10 it is $12.7 \times 10^{-7}/°$ C.

EXAMPLE 4

A GAPS polymer solution prepared with water at a pH of 10 is mixed with cordierite mix powder and methylcellulose (Methocel A4M) binder. The resulting compositions include (i) 1.1 wt. % methylcellulose, 12.2 wt. % silsesquioxane (polyaminosilsesquioxane) polymer, and 86.7 wt. % cordierite; and, (ii) 2.2 wt. % methylcellulose, 12.1 wt. % silsesquioxane polymer, and 85.7 wt. % cordierite.

MOR is measured on disks measuring 32 mm in diameter and 3 mm in thickness, after drying overnight at 60° C., and calcining for 4 hours at 500° C. In the samples having 1.1 wt. % methylcellulose the MOR at 60° C. is 9 MPa and at 500° C. it is 10 MPa. In the samples having 2.2 wt. % methylcellulose the MOR at 60° C. is 7 MPa and at 500° C. it is 8 MPa. Both samples show that the MOR values are much higher than comparative example 1.

At 60° C., the silsesquioxane polymer is not fully chemically condensed and still partly soluble in water. Therefore, it is most preferred to effect drying to 200° C. in order to attain insensitivity to water.

EXAMPLE 5

The presence of ethanol in the GAPS polymer solution may lead to bubble formation in resulting bulk/monolith ceramic samples. Ethanol is eliminated before preparing the cement mixture, by evaporation at ambient temperature under magnetic stirring. The ethanol evaporation rate is evaluated at 70 wt. % to obtain a silsesquioxane polymer gel which is dissolved in deionized water, and then mixed with cordierite mix powder to form a composition which includes 7 wt. % silsesquioxane polymer and 93 wt. % cordierite.

MOR is measured on disks measuring 32 mm in diameter and 3 mm in thickness, after drying overnight at 60° C., and at 200° C. The resulting MOR is 14 MPa, and 25 MPa respectively. The porosity is measured by mercury porosimetry to be 34 vol. %. This value is smaller than a porosity of 45 vol. % as measured on a ceramic prepared from a similar composition but without ethanol evaporation.

For good cement adhesion to honeycomb substrates, more polymerized GAPS is required in aqueous solutions than for alcoholic solutions. For example one measurement indicates 5 wt. % for aqueous solutions versus 1.5-2 wt. % for alcoholic solutions.

EXAMPLE 6

To the standard skin composition of Comparative Example 1 there is added GAPS polymer solution. Reported in Table II are the MOR results for three different additions of polymerized GAPS.

TABLE II

| wt. % of GAPS polymer solution | MOR (MPa) | |
|---|---|---|
| | After drying overnight at 60° C. | After firing for 4 hrs at 500° C. |
| 0 | 4.5 | 1 |
| 3 | 5 | 6 |
| 5 | 10 | — |
| 7 | 14 | 8 |

The MOR is much higher in the inventive cement compositions including the polymerized GAPS.

EXAMPLE 7

Polydimethylsiloxane (PDMS) is added to the cement composition of Example 7 containing 3 wt. % polymerized GAPS. A thicker coating is formed on a cordierite honeycomb substrate with reduced cracking after drying overnight at 60° C. and calcining for 4 hours at 500° C. The MOR is measured at 4.5 MPa following drying and 5 MPa following calcining, respectively. Therefore the addition of PDMS is beneficial to reducing crack formation while at the same time not having a negative impact on the high MOR resulting from the addition of the polymerized GAPS.

EXAMPLE 8

A ceramic composition is prepared by mixing 83.3% by weight of zircon ($ZrSiO_4$) powder (having particle size distribution of between 1-40 μm) and 16.7% by weight polymerized GAPS prepared by in a polymerization process of 1.5 mole of water at pH 10 for 1 mole of GAPS. The pH of the water is adjusted to 10 by the addition of sodium hydroxide. The resulting mixture is shaped into disks as described above and dried at 200° C. for 2 hours, and then calcined at 500° C. for 4 hours. The MOR is measured at between 37-45 MPa after drying and 18-20 MPa after calcining, respectively.

EXAMPLE 9

A ceramic composition is prepared by mixing 79.9% by weight of $Al_2O_3$ powder (average particle size of 9 μm) and 20.1% by weight polymerized GAPS prepared by in a polymerization process of 1.5 mole of water for 1 mole of GAPS. The pH of the water is adjusted with acetic acid to a value of 4. The resulting mixture is shaped into disks as described above and dried at 200° C. for 2 hours, and then calcined at 500° C. for 4 hours. The MOR is measured at between 12-16 MPa after drying and 5-7 MPa after calcining, respectively. The coefficient of thermal expansion (CTE) of the material after firing at 500° C. is measured at $70 \times 10^{-7}/°$ C. from 20 to 500° C.

EXAMPLE 10

A ceramic composition is prepared by mixing 83.3% by weight of zircon ($ZrSiO_4$) powder (having particle size distribution of between 1-40 μm) and 16.7% by weight polymerized GAPS prepared by in a polymerization process of 1.5 mole of water at pH 6 for 1 mole of GAPS. The resulting mixture is shaped into disks as described above and dried at 200° C. for 2 hours, and then calcined at 500° C. for 4 hours. The MOR is measured at 50 MPa after drying and 22 MPa after calcining, respectively. The porosity is measured by mercury porosimetry at 31% with an median pore diameter of 0.1 μm.

EXAMPLE 11

A ceramic composition is prepared by mixing 83.3% by weight of silicon carbide (SiC) powder (particle size of 45 μm) and 16.7% by weight polymerized GAPS prepared by in a polymerization process of 1.5 mole of water at pH 10 for 1 mole of GAPS. The resulting mixture is shaped into disks as described above and dried at 200° C. for 2 hours, and then calcined at 500° C. for 4 hours. The MOR is measured at 20 MPa after drying and 3 MPa after calcining, respectively. The CTE, measured on a bar of the SiC ceramic after firing at 500° C., is $35 \times 10^{-7}/°$ C. between 20 and 500° C.

EXAMPLE 12

A ceramic composition is prepared by mixing 83.3% by weight of sillimanite ($Al_2O_3$, $SiO_2$) powder and 16.7% by weight polymerized GAPS prepared by in a polymerization process of 1.5 mole of water at pH 10 for 1 mole of GAPS. The resulting mixture is shaped into disks as described above and dried at 200° C. for 2 hours, and then calcined at 500° C. for 4 hours. The MOR is measured at between 16-22 MPa after drying and 15-17 MPa after calcining, respectively.

What is claimed:

1. A composition for the manufacture of a ceramic comprising:
   a. 80% to 98% by weight of a ceramic material selected from the group consisting of oxides, oxidized non-oxides, and combinations thereof; and,
   b. 2% to 20% by weight polyaminopropylsilsesquioxane as a sintering agent for reducing the calcining temperature of the resulting ceramic and increasing the strength thereof, the silsesquioxane being of the chemical formula —($RSiO_{1.5}$)— wherein R is an aminopropyl group
   c. methylcellulose binder; and
   d. polydimethylsiloxane polymer.

2. The composition of claim 1 which further includes processing aids selected from the group consisting of binders, plasticizers, surfactants, fillers, lubricants and dispersants.

3. The composition of claim 1 wherein the ceramic material has a median particle size of between 0.1-100 micrometers.

4. The composition of claim 1 wherein the ceramic material is selected from the group consisting of silica-based oxides and alumina-based oxides.

5. The composition of claim 4 wherein the silica-based oxide is selected from the group consisting of cordierite, zircon, sillimanite, and mullite.

6. The composition of claim 4 wherein the alumina-based oxide is selected from the group consisting of alumina and aluminum titanate.

7. A method for forming a ceramic structure comprising:
   a. preparing a mixture from:
      i. a powdered ceramic material selected from the group consisting of oxides, oxidized non-oxides, and combinations thereof; and,
      ii. 2% to 20% by weight of a silsesquioxane polymer, the silsesquloxane being of the chemical formula —($RSiO_{1.5}$)— wherein R is an aminopropyl group or the silsesquioxane being an octa(tetramethyl ammonium) polyhedral oligomeric silsesquioxane;
   b. shaping the mixture; and,
   c. drying and calcining the mixture at a temperature and for a time sufficient to form a porous ceramic having an MOR strength of at least 5 MPa to at least 15 MPa, wherein water is added to the mixture prior to the shaping.

8. The method of claim 7 wherein the drying step is carried out at 60° C. to 200° C. for a period of 8 to 10 hours.

9. The method of claim 7 wherein the calcining is carried out at a temperature between 500° C. to 1500° C.

10. The method of claim 7 wherein the shaping step comprises applying a layer of the mixture to the exterior of a honeycomb substrate to form a coating.

11. The method of claim 10 wherein the coated honeycomb substrate is dried at 200° C. and calcined at 500° C.

12. The method of claim 7 wherein the ceramic material is a silica-based oxide.

13. The method of claim 7 wherein the ceramic material is a alumina-based oxide.

14. The composition of claim 7 wherein the mixture comprises 7% to 14% by weight silsesquioxane.

15. A composition for the manufacture of a ceramic comprising:
   a powdered ceramic material, the ceramic powder being cordierite ($2MgO.2Al_2O_3.5SiO_2$) and forming 86% to 93% by weight; and,
   an aminopropylsilsesquioxane polymer as a sintering agent for reducing the calcining temperature of the resulting ceramic and increasing the strength thereof, the aminopropylsilsesquioxane forming 7% to 14% by weight;
   the composition further comprising methylcellulose binder and polydimethylsiloxane polymer as processing aids.

16. The use of a composition comprising applying the composition to an external surface of a honeycomb structure, the composition comprising:
   a powdered ceramic material selected from the group consisting of oxides, oxidized non-oxides, and combinations thereof and,
   a silsesquioxane polymer as a sintering agent for reducing the calcining temperature of the resulting ceramic and increasing the strength thereof, the silsesquioxane being of the chemical formula —($RSiO_{1.5}$)— wherein R is an aminopropyl group or the silsesquioxane being an octa (tetramethyl ammonium) polyhedral oligomeric silsesqujoxane being added at 2% to 20% by weight.

17. A composition for the manufacture of a ceramic comprising:
   a powdered ceramic material selected from the group consisting of silicon carbide and silicon nitride; and,
   a silsesquioxane polymer as a sintering agent for reducing the calcining temperature of the resulting ceramic and increasing the strength thereof, the silsesquioxane being of the chemical formula —($RSiO_{1.5}$)— wherein R is an aminopropyl group or the silsesquioxane being an octa (tetramethyl ammonium) polyhedral oligomeric silsesquioxane being added at 2% to 20% by weight.

* * * * *